(12) United States Patent
Osawa et al.

(10) Patent No.: US 6,923,602 B2
(45) Date of Patent: Aug. 2, 2005

(54) DRILL HAVING CONSTRUCTION FOR REDUCING THRUST LOAD IN DRILLING OPERATION, AND METHOD OF MANUFACTURING THE DRILL

(75) Inventors: Jiro Osawa, Glendale Heights, IL (US); Kenjiro Kobayashi, Glendale Heights, IL (US); Kazuhisa Kasuya, Glendale Heights, IL (US); Takahiro Yamamoto, Toyokawa (JP); Yoshihiro Takikawa, Toyokawa (JP)

(73) Assignee: OGO Corporation, Toyokawa (JP)

( * ) Notice: Subject to any disclaimer, the term of this patent is extended or adjusted under 35 U.S.C. 154(b) by 263 days.

(21) Appl. No.: 10/123,134

(22) Filed: Apr. 17, 2002

(65) Prior Publication Data

US 2003/0188895 A1 Oct. 9, 2003

(30) Foreign Application Priority Data

Apr. 3, 2002 (JP) ....................................... 2002-101849

(51) Int. Cl.$^7$ ............................................. B23B 51/02
(52) U.S. Cl. ......................... 408/230; 451/48; 76/108.6
(58) Field of Search ................................ 408/144, 227, 408/230, 59; 451/48; 76/108.6

(56) References Cited

U.S. PATENT DOCUMENTS

| | | | |
|---|---|---|---|
| 4,116,580 A | | 9/1978 | Hall et al. |
| 4,583,888 A | * | 4/1986 | Mori et al. .................... 408/59 |
| 4,602,900 A | * | 7/1986 | Arpaio et al. ................ 408/230 |
| 4,744,705 A | * | 5/1988 | Imanaga ...................... 408/230 |
| 5,011,342 A | * | 4/1991 | Hsu .............................. 408/224 |
| 5,231,802 A | * | 8/1993 | Hosoi ........................... 451/48 |
| 5,433,655 A | * | 7/1995 | Shiokawa et al. ............. 451/48 |
| 5,486,075 A | * | 1/1996 | Nakamura et al. ............ 408/230 |
| 6,071,046 A | | 6/2000 | Hecht et al. |
| 6,315,504 B1 | * | 11/2001 | Sekiguchi et al. ............ 408/144 |
| 6,419,561 B1 | * | 7/2002 | George .......................... 451/48 |
| 6,585,460 B1 | * | 7/2003 | Meece et al. ................. 408/230 |
| 2003/0053873 A1 | * | 3/2003 | Shaffer ......................... 408/230 |

FOREIGN PATENT DOCUMENTS

| | | | | |
|---|---|---|---|---|
| DE | 3927615 | * | 2/1991 | .......... B23B/51/02 |
| EP | 0 681 882 A1 | | 11/1995 | |
| JP | 56-33214 | * | 4/1981 | .......... B23B/51/02 |
| JP | A 57-132908 | | 8/1982 | |
| JP | U 60-17912 | | 2/1985 | |
| JP | U 61-89415 | | 6/1986 | |
| JP | B2 5-32164 | | 5/1993 | |

(Continued)

*Primary Examiner*—Daniel W. Howell
(74) *Attorney, Agent, or Firm*—Oliff & Berridge, PLC

(57) ABSTRACT

A drill including a shank portion and a cylindrical body portion contiguous to each other. The cylindrical body portion includes (a) primary cutting edges and secondary cutting edges formed in its axially distal end portion such that each of the secondary cutting edges is located on a radially inner side of the corresponding primary cutting edge; (b) primary rake surfaces of the primary cutting edges and secondary rake surfaces of the secondary cutting edges; and (c) inclined surfaces each of which extends from the corresponding secondary rake surface to a periphery of the cylindrical body portion, and is inclined such that an axial distance between each of the inclined surfaces and the shank portion is reduced as viewed in a direction substantially perpendicular to the corresponding secondary cutting edge, from the corresponding secondary rake surface toward the periphery of the cylindrical body portion. Each of the secondary rake surfaces and the corresponding secondary cutting edge are formed together with each other in a web thinning. Each of the secondary rake surfaces and the corresponding inclined surface are connected to each other without a step therebetween.

18 Claims, 8 Drawing Sheets

FOREIGN PATENT DOCUMENTS

| | | |
|---|---|---|
| JP | A 5-138421 | 6/1993 |
| JP | A 5-220611 | 8/1993 |
| JP | A 7-237017 | 9/1995 |
| JP | A 7-308814 | 11/1995 |
| JP | A 8-39318 | 2/1996 |
| JP | A 11-267912 | 10/1999 |
| JP | A 11-333611 | 12/1999 |
| JP | A 2001-96412 | 4/2001 |
| JP | A 2001-96413 | 4/2001 |

* cited by examiner

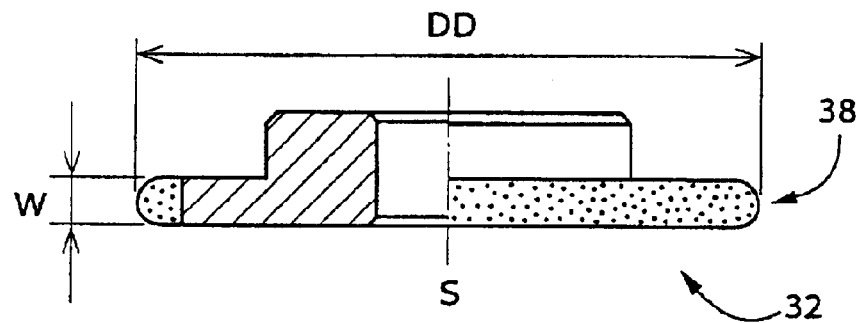
FIG. 5A
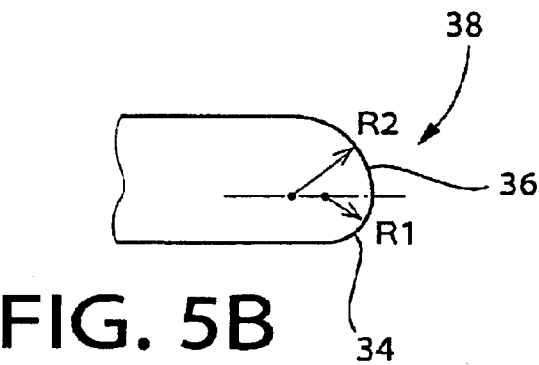
FIG. 5B
|  | W | R1 | R2 |
|---|---|---|---|
| No.1 | 2.0 | 0.5 | 1.5 |
| No.2 | 3.0 | 1.0 | 2.0 |
| No.3 | 4.0 | 1.5 | 2.5 |
| No.4 | 5.0 | 2.0 | 3.0 |
| No.5 | 6.5 | 2.5 | 4.0 |
| No.6 | 8.0 | 3.0 | 5.0 |
| No.7 | 9.0 | 3.5 | 5.5 |
FIG. 5C

NUMBER OF FORMED HOLES

THRUST LOAD

SURFACE HARDNESS (HV 0.1)

NUMBER OF FORMED HOLES

DRILL HAVING CONSTRUCTION FOR REDUCING THRUST LOAD IN DRILLING OPERATION, AND METHOD OF MANUFACTURING THE DRILL

BACKGROUND OF THE INVENTION

1. Field of the Invention

The present invention relates in general to a drill, and more particularly to techniques for providing a drill with a long tool life, by reducing a thrust load applied to the drill during a drilling operation for drilling a hole, and also by reducing a generation of friction heat, a wear of the drill and a cutting torque which are caused or increased by frictional contact of margins of the drill and an inner surface of the hole during the drilling operation.

2. Discussion of the Related Art

There is widely known a drill which has cutting lips or edges formed in its axially distal end portion, and chip evacuation flutes formed to extend generally in its axial direction. The drill is used to originate or enlarge a hole in a workpiece, by rotating the drill about its axis and moving the drill and the workpiece relative to each other in the axial direction, so that the workpiece is cut with the cutting edges while chips are allowed to be evacuated from the hole through the flutes. Such a drill has margins which extend along the respective flutes and which have an outside diameter substantially equal to that of the cutting edges. It is common that a cylinder defined by a rotary trajectory of the margins is slightly back-tapered so that the diameter of the margins is gradually reduced as viewed in a direction away from the axially distal end portion toward the axially proximal end portion of the drill (i.e., toward a shank portion of the drill). JP-A-H7-308814 (publication of unexamined Japanese Patent Application laid open in 1995) discloses a drill in which a point thinning or web thinning is made in its chisel edge such that a radially inner portion of each of the cutting edges is ground to provide a secondary cutting edge, while an inclined surface that is contiguous to a rake surface of the secondary cutting edge is formed. This inclined surface is inclined toward the shank portion as the inclined surface extends from the rake surface toward the periphery of the drill in a direction substantially perpendicular to the secondary cutting edge.

FIG. 9A is a perspective view of a distal end portion of such a conventional drill, while FIG. 9B is a cross sectional view taken along line 9B—9B of FIG. 9A. This conventional drill has a pair of cutting lips or edges 100, and first and second flank surfaces 102, 104 which are formed on a rear side of each of the cutting edges 100 as viewed in a rotating direction of the drill. Oil holes 106 are formed throughout the entire axial length of the drill, and open in the respective second flank surfaces 104. The cutting edges 100 are provided by axially distal open ends of respective chip evacuation flutes 108, which are formed in a body of the drill for allowing chips to be evacuated from a hole therethrough during a drilling operation with the drill. A pair of radially inner cutting edges 112 are formed in a radially inner side of the respective chip evacuation flutes 108 by using a thinning grinding wheel 110, as shown in FIG. 9B, such that each of the radially inner cutting edges 112 as a secondary cutting edge is located on a radially inner side of the corresponding cutting edge 100 as a primary cutting edge and is contiguous to the corresponding cutting edge 100. This type of web thinning is commonly called as "Radial Point Thinning" or "R-type Thinning" since the radially inner or secondary cutting edge 112 is formed to have a predetermined radius of curvature. The thinning grinding wheel 110 has an axial end surface and an outer circumferential surface which intersect each other at an angle $\alpha 1$ of about 110°. A rake surface 114 of the secondary cutting edge 112 and a web-thinning bottom surface 116 are formed concurrently with each other by the axial end surface and the outer circumferential surface of the thinning grinding wheel 110, respectively.

An inclined surface 120 is formed by using another grinding wheel 118, so as to extend from the web-thinning bottom surface 116 up to the periphery of the drill. This inclined surface 120, serving to evacuate chips produced by cutting of a workpiece with the secondary cutting edge 112, is inclined toward the shank portion as the inclined surface 120 extends from the bottom surface 116 toward the periphery of the drill in the rightward direction as seen in FIG. 9B, i.e., in a direction substantially perpendicular to the secondary cutting edge 112. In other words, an axial distance between the inclined surface 120 and the proximal end of the drill is gradually reduced as viewed in the direction away from the rake surface 114 toward the periphery of the drill. The inclined surface 120 has a lager clearance angle than the second flank surface 104, and is located on a rear side (as viewed in a rotating direction of the drill) of the second flank surface 104 and is contiguous to the second flank surface 104. The grinding wheel 118 has an axial end surface and an outer circumferential surface which intersect each other at an angle $\alpha 2$ of about 100°. The inclined surface 120 is formed by the outer circumferential surface of the grinding wheel 118.

In the above-described conventional drill, however, since the web-thinning bottom surface 116 and the inclined surface 120 formed by the respective different grinding wheels have respective different shapes, a protrusion or step 122 is inevitably formed along an entirety or part of a boundary between the two surfaces 116, 120. In other words, since the bottom surface 116 has a complicated three-dimensional geometry, it is extremely difficult to smoothly connect the inclined surface 120 to the bottom surface 116 without a step in the entirety of the boundary between the two surfaces 116, 120. The step 122 impedes the evacuation of the chips, making it difficult to reduce a thrust load applied to the drill during a drilling operation, thereby making it impossible to provide a satisfactorily prolonged tool life. It might be possible to reduce the thrust load, by increasing a depth of each chip evacuation flute 108 and reducing a web thickness of the drill. However, a considerable reduction in the web thickness over the entire length of the drill body leads to an undesirable reduction in the rigidity or mechanical strength of the drill, failing to provide a technical advantage favorable for an increase in the tool life after all.

Further, the above-described conventional drill suffers from other problems that a cutting torque is undesirably increased due to a friction generated by contact of margins of the drill with an inner circumferential surface of the hole, thereby deteriorating a cutting performance of the drill, and that a friction heat and a wear of each of the margins are generated and caused by the contact of the margins and the inner circumferential surface of the hole, thereby reducing the tool life, i.e., the number of the holes which can be drilled without regrinding or resharpening the cutting edges of the drill. It might be possible to reduce the cutting torque and the friction heat, by reducing a width of each margin of the drill, namely, by reducing an area of the contact of the margins and the inner circumferential surface of the hole. However, a considerable reduction in the margin width leads to a reduction in the strength of each margin, probably causing fracture at a boundary between the margin and the flank surface of a land (which is located on the rear side of the margin), and the consequent chipping of a leading edge (which is provided by the rear-side one of widthwise opposite edges of the chip evacuation flute).

SUMMARY OF THE INVENTION

The present invention was made in view of the background prior art discussed above. It is therefore a first object of the present invention to provide a drill having a tool life prolonged owing to its construction which is effective to reduce a thirst load applied to the drill during a drilling operation for a hole, without reducing a web thickness over the entire length of the drill body, and which is also effective to reduce a generation of friction heat, a wear of the drill and a cutting torque that are caused or increased by frictional contact of margins of the drill and an inner circumferential surface of the hole during the drilling operation. This first object may be achieved according to any one of first through fifteenth aspects of the invention which are described below.

It is a second object of the invention to provide a method of manufacturing the drill having the technical advantage as described above. This third object may be achieved according to any one of sixteenth through twentieth aspects of the invention which are described below.

The first aspect of this invention provides a drill which is to be rotated about an axis thereof in a predetermined rotating direction, for drilling a hole in a workpiece, and which comprises a shank portion and a cylindrical body portion contiguous to each other, wherein the cylindrical body portion includes: (a) primary cutting edges and secondary cutting edges formed in an axially distal end portion thereof such that each of the secondary cutting edges is located on a radially inner side of a corresponding one of the primary cutting edges; (b) primary rake surfaces of the primary cutting edges and secondary rake surfaces of the secondary cutting edges; and (c) inclined surfaces each of which extends from a corresponding one of the secondary rake surfaces to a periphery of the cylindrical body portion, and is inclined such that an axial distance between each of the inclined surfaces and the shank portion is reduced as viewed in a direction substantially perpendicular to a corresponding one of the secondary cutting edges, from the corresponding one of the secondary rake surfaces toward the periphery of the cylindrical body portion, wherein each of the secondary rake surfaces and the corresponding one of the secondary cutting edges are formed together with each other in a web thinning, and wherein each of the secondary rake surfaces and the corresponding one of the inclined surfaces are connected to each other without a step therebetween, namely, without a difference in level therebetween.

According to the second aspect of the invention, in the drill defined in the first aspect of the invention, each of the inclined surfaces is formed by an outer circumferential surface of a grinding wheel, while the corresponding one of the secondary rake surfaces is formed, concurrently with formation of each of the inclined surfaces, by an axial end surface of the grinding wheel which intersects the outer circumferential surface of the grinding wheel at a predetermined angle.

According to the third aspect of the invention, in the drill defined in the second aspect of the invention, the predetermined angle is 90–110°.

According to the fourth aspect of the invention, in the drill defined in any one of the first through third aspects of the invention, the cylindrical body portion further includes distal end flank surfaces each of which is located on a rear side of a corresponding one of the primary cutting edges and a corresponding one of the secondary cutting edges as viewed in the predetermined rotating direction, and each of which has a clearance angle that permits an axial distance between each of the flank surfaces and the shank portion to be reduced as viewed in the predetermined rotating direction, wherein each of the inclined surfaces is located on a rear side of a corresponding one of the flank surfaces as viewed in the predetermined rotating direction, and has a clearance angle which is larger than that of the corresponding one of the flank surfaces, and wherein each of the secondary cutting edges is curved as seen in a plan view that is perpendicular to the axis.

According to the fifth aspect of the invention, in the drill defined in any one of the first through fourth aspects of the invention, the cylindrical body portion has flutes each of which extends from the axially distal end portion toward an axially proximal end portion thereof, and margins each of which is located on a rear side of a corresponding one of the flutes and extends along a corresponding one of the flutes, wherein each of the margins has a non-relief surface which intersects the corresponding one of the flutes to provide a leading edge, and a relief surface which is located on a rear side of the non-relief surface as viewed in the predetermined rotating direction, wherein the non-relief surface has a width of 0.1–0.5 mm as measured in a circumferential direction of the cylindrical body portion, and wherein a radial distance of the non-relief surface from the axis is substantially constant as viewed in the predetermined rotating direction, while a radial distance of the relief portion from the axis is gradually reduced as viewed in the predetermined rotating direction.

According to the sixth aspect of the invention, in the drill defined in the fifth aspect of the invention, the width of the non-relief surface is not larger than two thirds (⅔) of a width of each of the margins as measured in the circumferential direction.

According to the seventh aspect of the invention, in the drill defined in the fifth or sixth aspect of the invention, the cylindrical body portion further has lands each of which is located on a rear side of a corresponding one of the margins as viewed in the predetermined rotating direction, wherein the relief surface of each of the margins has a predetermined clearance angle not larger than 20° as seen in a cross sectional plane perpendicular to the axis, and wherein the relief surface of each of the margins and a surface of a corresponding one of the lands are connected to each other with a step therebetween.

According to the eighth aspect of the invention, in the drill defined in any one of the first through seventh aspects of the invention, the cylindrical body portion further includes distal end flank surfaces each of which is located on a rear side of a corresponding one of the primary cutting edges and a corresponding one of the secondary cutting edges as viewed in the predetermined rotating direction, and wherein the drill further comprises oil holes which are formed to extend in an axial direction thereof and which open in the end flank surfaces.

According to the ninth aspect of the invention, in the drill defined in any one of the first through eighth aspects of the invention, the cylindrical body portion is provided by a substrate which is formed of a hard tool material and which is coated with a hard coating.

According to the tenth aspect of the invention, in the drill defined in the ninth aspect of the invention, the hard coating is formed of an intermetallic compound that consists of a solid solution including at least one of carbide, nitride and carbon nitride each of which includes at least one of metals which belong to respective groups IIIb, IVa, Va and VIa of the periodic table.

According to the eleventh aspect of the invention, in the drill defined in any one of the first through tenth aspects of the invention, the cylindrical body portion further has lands each of which is located on a rear side of a corresponding one of the margins as viewed in the predetermined rotating direction, wherein each of the lands has a beveled face in a rear end thereof as viewed in the predetermined rotating direction, and wherein the beveled face has a width of 0.15D to 0.25D as measured in a radial direction of the cylindrical body portion, where D represents a diameter of the primary cutting edges.

The twelfth aspect of this invention provides a drill which is to be rotated about an axis thereof in a predetermined rotating direction, for drilling a hole in a workpiece, comprising: (a) flutes each extending from an axially distal end portion of the drill toward an axially proximal end portion of the drill; and (b) margins each of which is located on a rear side of a corresponding one of the flutes and extends along a corresponding one of the flutes, wherein each of the margins has a non-relief surface which intersects the corresponding one of the flutes to provide a leading edge, and a relief surface which is located on a rear side of the non-relief surface as viewed in the predetermined rotating direction, wherein the non-relief surface has a width of 0.1–0.5 mm as measured in a circumferential direction of the cylindrical body portion, and wherein a radial distance of the non-relief surface from the axis is substantially constant as viewed in the predetermined rotating direction, while a radial distance of the relief portion from the axis is gradually reduced as viewed in the predetermined rotating direction.

According to the thirteenth aspect of the invention, in the drill defined in the twelfth aspect of the invention, the width of the non-relief surface is not larger than two thirds of a width of each of the margins as measured in the circumferential direction.

According to the fourteenth aspect of the invention, the drill defined in the twelfth or thirteenth aspect of the invention further comprising lands each of which is located on a rear side of a corresponding one of the margins as viewed in the predetermined rotating direction, wherein the relief surface of each of the margins has a predetermined clearance angle not larger than 20° as seen in a cross sectional plane perpendicular to the axis, and wherein the relief surface of each of the margins and a surface of a corresponding one of the lands are connected to each other with a step therebetween.

The fifteenth aspect of this invention provides a drill which is to be rotated about an axis thereof in a predetermined rotating direction, for drilling a hole in a workpiece, comprising a cylindrical body portion having: (a) primary cutting edges and secondary cutting edges formed in an axially distal end portion thereof such that each of the secondary cutting edges is located on a radially inner side of a corresponding one of the primary cutting edges; (b) flutes each of which extends from the axially distal end portion toward an axially proximal end portion thereof; (c) distal end flank surfaces each of which is located on a rear side of a corresponding one of the primary cutting edges and a corresponding one of the secondary cutting edges as viewed in the predetermined rotating direction, and each of which has a clearance angle that permits an axial distance between each of the flank surfaces and the axially proximal end portion to be reduced as viewed in the predetermined rotating direction; (d) inclined surfaces each of which is located on a rear side of a corresponding one of the flank surfaces as viewed in the predetermined rotating direction, and has a clearance angle larger than that of the corresponding one of the flank surfaces; (e) primary rake surfaces of the primary cutting edges and secondary rake surfaces of the secondary cutting edges, each of the secondary rake surfaces being located on a radially inner side of a corresponding one of the primary rake surfaces, wherein each of the secondary rake surfaces and the corresponding one of the primary rake surfaces are provided by an axially distal end portion of a rear side wall, as viewed in the predetermined rotating direction, of a corresponding one of the flutes, wherein each of the secondary rake surfaces is recessed in such a direction that permits a web thickness in the axially distal end portion to be reduced, wherein each of the inclined surfaces extends from a corresponding one of the secondary rake surfaces to a periphery of the cylindrical body portion, and is inclined such that an axial distance between each of the inclined surfaces and the axially proximal end portion is reduced as viewed in a direction which is substantially perpendicular to a corresponding one of the secondary cutting edges, away from the corresponding one of the secondary rake surfaces toward the periphery of the cylindrical body portion, and wherein each of the inclined surfaces and the corresponding one of the secondary rake surfaces are connected to each other without a step therebetween.

The sixteenth aspect of this invention provides a method of manufacturing a drill which is to be rotated about an axis thereof in a predetermined rotating direction for drilling a hole in a workpiece, and which comprises a shank portion and a cylindrical body portion contiguous to each other, wherein the cylindrical body portion includes: (a) primary cutting edges and secondary cutting edges formed in an axially distal end portion thereof such that each of the secondary cutting edges is located on a radially inner side of a corresponding one of the primary cutting edges; (b) primary rake surfaces of the primary cutting edges and secondary rake surfaces of the secondary cutting edges; and (c) inclined surfaces each of which extends from a corresponding one of the secondary rake surfaces to a periphery of the cylindrical body portion, and is inclined such that an axial distance between each of the inclined surfaces and the shank portion is reduced as viewed in a direction substantially perpendicular to a corresponding one of the secondary cutting edges, from the corresponding one of the secondary rake surfaces toward the periphery of the cylindrical body portion, the method comprising: a step of forming each of the inclined surfaces by an outer circumferential surface of a grinding wheel, while at the same time forming the corresponding one of the secondary rake surfaces by an axial end surface of the grinding wheel which intersects the outer circumferential surface of the grinding wheel at a predetermined angle.

According to the seventeenth aspect of the invention, in the method defined in the sixteenth aspect of the invention, the predetermined angle is 90–110°.

The eighteenth aspect of this invention provides a method of manufacturing the drill defined in the above-described first aspect of the invention, wherein the cylindrical body portion has flutes each of which extends from the axially distal end portion toward an axially proximal end portion thereof, and is twisted by a predetermined helix angle, each of the flutes having widthwise opposite edges one of which is located on a rear side of the other as viewed in the predetermined rotating direction and provides a leading edge, the method comprising: (a) a step of positioning a grinding wheel in a predetermined position relative to the drill such that an axis of the grinding wheel is inclined with respect to a direction perpendicular to the axis of the drill by an angle that is equal to the predetermined helix angle; and (b) a step of forming each of the flutes by the grinding wheel, after positioning the grinding wheel in the predetermined position, wherein the grinding wheel has a convexed outer circumferential surface including first and second arcuate portions which are connected to each other at a radially outer end of the outer circumferential surface, and wherein the first arcuate portion has a radius of curvature smaller than a radius of curvature of the second arcuate portion.

According to the nineteenth aspect of the invention, in the method defined in the eighteenth aspect of the invention, the grinding wheel is positioned relative to the drill such that the leading edge is closer to the first arcuate portion than to the second arcuate portion.

According to the twentieth aspect of the invention, in the method defined in the eighteenth or nineteenth aspect of the invention, a ratio of the radius of curvature of the second arcuate portion to the radius of curvature of the first arcuate portion is 1.5 to 3.0.

In the drill defined any one of the first through eleventh and fifteenth aspects of the invention in which each of the inclined surfaces and the corresponding one of the secondary rake surfaces are connected to each other without a step therebetween, the chips produced by the cutting of the workpiece with the secondary cutting edges are easily evacuated from the hole. The easy evacuation of the chips leads to a reduction in a thrust load applied to the drill and minimizes a heat generation during a drilling operation with the drill, thereby increasing the number of the holes which can be drilled without regrinding or resharpening the cutting edges of the drill, and accordingly prolonging the tool life.

In the drill defined in the second aspect of the invention, each of the inclined surfaces is formed by the outer circumferential surface of the grinding wheel, while the corresponding one of the secondary rake surfaces is formed, concurrently with formation of each inclined surface, by the axial end surface of the grinding wheel which intersects the outer circumferential surface of the grinding wheel at a predetermined angle. In this arrangement, the intersection between the secondary rake surface and the inclined surface is formed by the intersection between the axial end surface and the outer circumferential surface of the grinding wheel, whereby the profile of the grinding wheel is transferred to the formed two adjacent surfaces, assuring absence of step between the two adjacent surfaces. Further, in this arrangement in which the two adjacent surfaces are formed together with each other at a single step, the number of required steps and cost for manufacturing the drill are reduced to be smaller than in the conventional arrangement in which the two adjacent surfaces are formed at two individual steps at each of which a complicated positioning of the grinding tool relative to the drill is required prior to the grinding operation.

In the drill defined in the fifth or twelfth aspect of the invention, each of the margins has, in addition to the non-relief surface having the width of 0.1–0.5 mm, the relief surface which is located on the rear side of the non-relief portion and which has the radial distance from the axis that is gradually reduced as viewed in the predetermined rotating direction of the drill. This arrangement is effective to reduce the area of contact of the margins and the inner circumferential surface of the hole, without reduction in the strength of the margins which reduction would cause fracture or chipping of the tool, thereby preventing increases of the cutting torque due to the friction generated by the contact, and improving the cutting performance of the tool. Therefore, the arrangement advantageously increases the number of the holes which can be drilled without regrinding or resharpening the cutting edges of the drill, and accordingly prolongs the tool life.

In the drill defined in the sixth or thirteenth aspect of the invention, since the width of the non-relief surface is held equal to or smaller than two thirds of the width of each margin, the generation of the friction by the contact of the margins and the inner circumferential surface is sufficiently reduced, whereby the above-described technical advantage owing to the reduction of the friction is reliably obtained.

In the drill defined in the seventh or fourteenth aspect of the invention in which the clearance angle of the relief surface of each margin is held equal to or smaller than 20° so that a step having a predetermined height exists between each margin and the corresponding land, it is possible to obtain the technical advantage owing to the reduction of the friction while assuring the sufficiently high degree of strength of each margin.

The drill defined in the eighth aspect of the invention, in which the oil holes are formed to extend through the drill body and open in the end flank surfaces, is capable of drilling the hole in a workpiece with supply of a lubricant oil or other cutting fluid through the oil holes, by minimizing the friction between the drill and the inner surface of the hole and accordingly reducing the heat generation and the wear of the drill body, even where the workpiece is made of a hard material such as an alloy steel. Thus, the drill of this eighth aspect has a further prolonged tool life.

In the drill defined in the ninth aspect of the invention in which the substrate of the drill body is formed of a hard tool material and is coated with a hard coating, the heat generation and the wear of the drill body due to the friction are further effectively minimized, whereby the tool life is further prolonged.

In the drill defined in the eleventh aspect of the invention in which the beveled face having a width of 0.15–0.25 times the diameter of the drill is formed at the circumferentially rear end of each of the lands, the chips are effectively evacuated from the hole, preventing each of the flutes from being clogged up with the chips.

In the method defined in the sixteenth or seventeenth aspect of the invention, each inclined surface is formed by the outer circumferential surface of the grinding wheel, while the corresponding secondary rake surface is formed, concurrently with formation of each inclined surface, by the axial end surface of the grinding wheel which intersects the outer circumferential surface of the grinding wheel at a predetermined angle. In this arrangement, the intersection between the secondary rake surface and the inclined surface is formed by the intersection between the axial end surface and the outer circumferential surface of the grinding wheel, whereby the profile of the grinding wheel is transferred to the formed two adjacent surfaces, assuring no step between the two adjacent surfaces. Therefore, the chips produced by the cutting of the workpiece with the secondary cutting edges are easily evacuated from the hole. The easy evacuation of the chips leads to a reduction in a thrust load applied to the drill and minimizes a heat generation during a drilling operation with the drill, thereby increasing the number of the holes which can be drilled without regrinding or resharpening the cutting edges of the drill, and accordingly prolonging the tool life. Further, in this arrangement in which the two adjacent surfaces are formed together with each other at a single step, the number of required steps and cost for manufacturing the drill is reduced to be smaller than in the conventional arrangement in which the two adjacent surfaces are formed at two individual steps at each of which a complicated positioning of the grinding tool relative to the drill is required prior to the grinding operation.

In the method defined in any one of the eighteenth through twentieth aspects of the invention, each of the flutes is formed by the grinding wheel having the unsymmetrical convexed outer circumferential surface including the two arcuate portions which have respective different radii of curvatures and which are connected to each other at the radially outer end of the outer circumferential surface. Therefore, each flute, formed by the unsymmetrical convexed outer circumferential surface of the grinding wheel, also has an unsymmetrical cross sectional shape, which makes it possible to divide each of the chips into smaller pieces, by one of its widthwise opposed side surfaces which has a smaller radius of curvature than that of the other. It is needles to say that the dividing of each chip into the smaller pieces facilitates evacuation of the chips from the hole, further reliably preventing each flute from being clogged up with the chips.

In the method defined in the nineteenth aspect of the invention, the grinding wheel is positioned relative to the drill such that the leading edge is closer to the first arcuate portion having the relatively small radius of curvature, than to the second arcuate portion having the relatively large radius of curvature. Therefore, in the drill manufactured according to this method, the above-described one of the widthwise opposed side surfaces having the smaller radius of curvature provides a rear-side one of the widthwise opposed side surfaces of each flute, onto which the chips are likely to be concentrated, rather than onto a front-side one of the widthwise opposed side surfaces. This arrangement is effective to further reliably divide each chip into smaller pieces and further effectively prevent each flute from being clogged.

In the process of the formation of each flute which is twisted by predetermined helix angle with respect to the axis of the drill, the grinding wheel rotated about its axis is held in contact with a workpiece or blank (for providing the drill), while the grinding wheel and the drill blank are moved relative to each other in the circumferential direction as well as in the axial direction. In such a process, it is common that at least one of the axial end surfaces of the grinding wheel interferes with a portion of the flute which is located in a rear side of a portion of the flute being currently ground by the grinding wheel, namely, which has been already ground by grinding wheel. Although the formed flute has the unsymmetrical cross sectional shape substantially corresponding to the unsymmetrical outer circumferential surface of the grinding wheel, the cross sectional shape of the formed flute is not completely identical with the contour of the outer circumferential surface of the grinding wheel, due to the above-described interference.

The principle of the invention is applicable to a twist drill in which the flute or flutes are formed to extend in a helical direction of the drill body, a straight flute drill in which the flute or flutes are formed to extend in parallel with the axis of the drill body, a drill in which more than two flutes are formed, a double margin drill in which two margins are provided at respective widthwise opposite ends of each land, or any other type of drill.

In each of the above-described second, third, sixteenth and seventeenth aspects of the invention, each of the inclined surface is formed by the outer circumferential surface of the grinding wheel, while at the same time the corresponding secondary rake surface is formed by the axial end surface of the same grinding wheel. Namely, in each of these aspects of the invention, each inclined surface is formed concurrently with the web thinning, whose principal purpose is forming the secondary rake surface in the form of the recessed surface, so as to reduce the web thickness in the axially distal end portion of the drill body. However, the inclined surface does not have to be necessarily formed together with the secondary rake in the web thinning, but may be formed at another step. In this case, if there exists a step between the inclined surface and the web-thinning bottom surface (which is formed in the web thinning), such a step can be ground to be eliminated at still another step.

While the grinding wheel used in the third or seventeenth aspect of the invention has the axial end surface and the outer circumferential surface intersecting each other at the predetermined angle of 90–110°, this angle does not have to be necessarily have to be held within this range in each of the second or sixteenth aspect of the invention. It is preferable that the axial end surface and the outer circumferential surface of the grinding wheel intersect with each other via a curved beveled face having a predetermined radius of curvature. However, the two surfaces may intersect directly each other, so as to form an edge at the intersection.

It is preferable but not essential that the web thinning requiring a high degree of accuracy is made before the formation of the distal end flank surfaces. That is, the formation of the distal end flank surfaces may be made before the web thinning. The web thinning does no have to be necessarily of "Radial Point Thinning (R-type Thinning)" for adapting each secondary cutting edge to be curved as seen in a bottom plan view, but may be of any other type of thinning such as "High Tensile Notched Point (N-type Thinning)" and "Splint Point Thinning (X-type Thinning)".

In the drill defined in the fifth or twelfth aspect of the invention, the relief surface of each of the margins may have a straight shape, a concaved shape concaved toward the axis of the drill, or a convexed shape convexed outwardly in the radial direction as seen in a cross sectional plane perpendicular to the axis. It is preferable that the relief portion is contiguous to the non-relief portion without a step therebetween. The preferable clearance angle of the relief surface varies depending upon the ratio of the width of the non-relief surface to the entire width of the margin and also the cross sectional shape of the relief surface. However, in general, the clearance angle of the relief surface is preferably not larger than about 45°, more preferably not larger than 20° as in the seventh and fourteenth aspects of the invention.

The relief surface of each margin can be formed in the same manner as in a grinding operation for forming a flank surface of an outer peripheral cutting edge of a milling cutter. Where the drill consists of a twist drill in which each margin extends together with the corresponding helical flute, the relief surface can be formed by rotating and axially moving the grinding wheel and the drill relative to each other such that the grinding wheel moves along the margin while being forced onto the margin. However, it should be noted that the method of forming the relief surface is not particularly limited.

It is preferable that the relief surface is formed over the entire axial length of each margin. However, the relief surface does not have to be formed necessarily over the entire axial length of each margin, but may be formed only in a portion of each margin which is located in the axially distal end portion of the drill body, particularly, where a cylinder defined by a rotary trajectory of the margins is slightly back-tapered, i.e., where a force of friction between the margins and the inner circumferential surface of the hole is larger in the axially distal end portion of the drill body than in the other portion of the drill body. It is also possible to form the relief surface such that the width of the non-relief portion and the width of the relief portion are gradually increased and reduced, respectively, as viewed in a direction away from the axially distal end portion of the drill body toward the axially distal end portion of the drill body. This means that the width of the non-relief surface does not have be held in a predetermined range (e.g. 0.1–0.5 mm) over the entire axial length of the drill body as long as the width is held in the predetermined range in at least the axially distal end portion of the drill body in which the primary and secondary cutting edges are formed.

The width of the non-relief surface of each margin is held in preferably a range of 0.1–0.5 mm, more preferably a range of 0.1–0.3 mm. If the width of the non-relief surface is smaller than 0.1 mm, each leading edge is likely to be fractured or chipped. If the width is larger than 0.5 mm, it is difficult to satisfactorily reduce the friction acting between each margin and the inner circumferential surface of the hole, particularly, where the width of each margin is large.

The width of each margin may determined suitably on the basis of various factors such as the diameter of the drill, i.e. the diameter of the primary cutting edges or margins. For example, the width of each margin may be held within a range of 0.1D–0.2D, where D represents the diameter of the primary cutting edges. The body diameter clearance, namely, the radial distance of the surface of land from the periphery of the drill body (i.e., the radially outer end of each cutting edge or the non-relief surface of each margin) may be determined suitably on the basis of various factors such as the width of each margin. For example, this radial distance may be held within a range of $0.2t_1$–$0.5t_1$, where $t_1$ represents the width of each margin.

In the drill defined in the sixth or thirteenth aspect of the invention, the width of the non-relief surface is not larger than two thirds of that of the margin. In the drill defined in the seventh or fourteenth aspect of the invention, the clearance angle of the relief surface is not larger than 20°. However, in the drill defined in the fifth or twelfth aspect of the invention, the width of the non-relief surface may be larger than two thirds of that of the margin while the clearance angle of the relief surface may be larger than 20°. The width of the non-relief surface may be held within a range of about one sixth (⅙) to two thirds (⅔) of that of the margin. The clearance angle of the relief surface is preferably held in a range of 10°–20°, for satisfactorily reducing the friction while assuring a required degree of strength of the margin. However, this range of the clearance angle is not essential, as long as the clearance angle is larger than 0°.

In the drill defined in the seventh or fourteenth aspect of the invention, the relief surface of each margin and the surface of the corresponding land are connected to each other with a step therebetween. However, in the drill defined in each of the other aspects of the invention, such a step does not have to be intentionally formed between the two surfaces, and the relief surface of each margin may be smoothly connected to the surface of the corresponding land without a step therebetween.

In the description of the present specification, each margin is defined to be constituted by not only a portion providing the non-relief surface but also a portion providing the relief surface, since this relief-surface providing portion can be formed by grinding a rear portion (as viewed in the rotating direction) of the margin downwardly in the radial direction. However, each margin may be interpreted to be constituted by only the portion providing the non-relief surface. In this case, the width of the margin corresponds to that of the non-relief surface, and the relief-surface proving portion may be referred to as a margin supporting portion.

In the method defined in the eighteenth aspect of the invention, each flute is formed by using the grinding wheel having the unsymmetrical convexed outer circumferential surface including the two arcuate portions which have respective different radii of curvatures and which are connected to each other at the radially outer end of the outer circumferential surface, so that the formed flute has the unsymmetrical cross sectional shape. However, in the method defined in each of the other aspects of the invention, the shape or contour of the grinding wheel used for forming each flute may be otherwise modified. For example, the used grinding wheel may have a symmetrical outer circumferential surface which has a arcuate cross sectional shape having a constant radius of curvature, so that the formed flute has a symmetrical cross sectional shape.

In the method defined in the nineteenth aspect of the invention, the grinding wheel is positioned relative to the drill such that the leading edge is closer to the first arcuate portion having the relatively small radius of curvature, than to the second arcuate portion having the relatively large radius of curvature. In the method defined in the twentieth aspect of the invention, the ratio of the radius of curvature of the second arcuate portion to that of the first arcuate portion is held within a range of 1.5–3.0. However, the leading edge may be closer to the second arcuate portion than to the first arcuate portion in the positioning of the grinding wheel relative to the drill. The ratio of the radius of curvature of the second arcuate portion to that of the first arcuate portion may be held within a range that is different from the above-described range.

While the oil holes are formed in the drill defined in the eighth aspect of the invention, the oil holes are not essential but may be formed as needed, for example, depending upon the material of the workpiece which is to be drilled. While the beveled face is formed in the rear end of each land to have a width of 0.15D to 0.25D in the drill defined in the eleventh aspect of the invention, the beveled face is not essential but may be formed as needed. Further, the width of the beveled face may be held within a range that is different from the above range of 0.15D to 0.25D. The beveled face may be straight or curved as seen in a cross sectional plane perpendicular to the axis.

In the drill defined in the ninth aspect of the invention, the shank portion, in addition to the body portion, may be provided by the substrate formed of the hard material, or alternatively, the shank portion may be formed of the other material such as a high speed steel. While the substrate providing the cylindrical body portion is formed of the hard tool material such as a cemented carbide in the drill defined in the ninth aspect of the invention, the cylindrical portion may be formed of a high speed steel or any other tool material. The hard coating may be formed of an intermetallic compound as in the tenth aspect of the invention, or may be formed of any other material such as a diamond coating.

The metal belonging to the group IIIb, IVa, Va or VIa may be, for example, Al, Ti, V or Cr. The solid solution providing the intermetallic compound may be, for example, TiAlN alloy, TiCN alloy, TiCrN alloy or TiN alloy. While the hard coating of the intermetallic compound is preferably formed, in accordance with a PVD method such as arc ion plating method and sputtering method, the hard coating may be formed in accordance with a plasma CVD method or any other method.

While each inclined surface and the corresponding secondary rake surface are connected to each other without a step therebetween in the drill defined in each of the first through eleventh and fifteenth aspects of the invention, the two surfaces may be connected to each other either with or without a step therebetween in the drill defined in each of the twelfth through fourteen aspects of the invention.

BRIEF DESCRIPTION OF THE DRAWINGS

The above and other objects, features, advantages and technical and industrial significance of this invention will be better understood by reading the following detailed description of the presently preferred embodiment of the invention, when considered in connection with the accompanying drawings, in which:

FIG. 5A is a view partially in cross section of a grinding wheel which is used for forming each chip evacuation flute of the drill of FIG. 1A;

FIG. 5B is a view in enlargement a cross sectional shape of a convexed outer circumferential surface of the grinding wheel of FIG. 5A which includes arcuate portions having respective different radii of curvatures R1, R2;

FIG. 5C is a table indicating examples of combination of the radii of curvatures R1, R2;

DETAILED DESCRIPTION OF THE PREFERRED EMBODIMENT

Figure 1A:
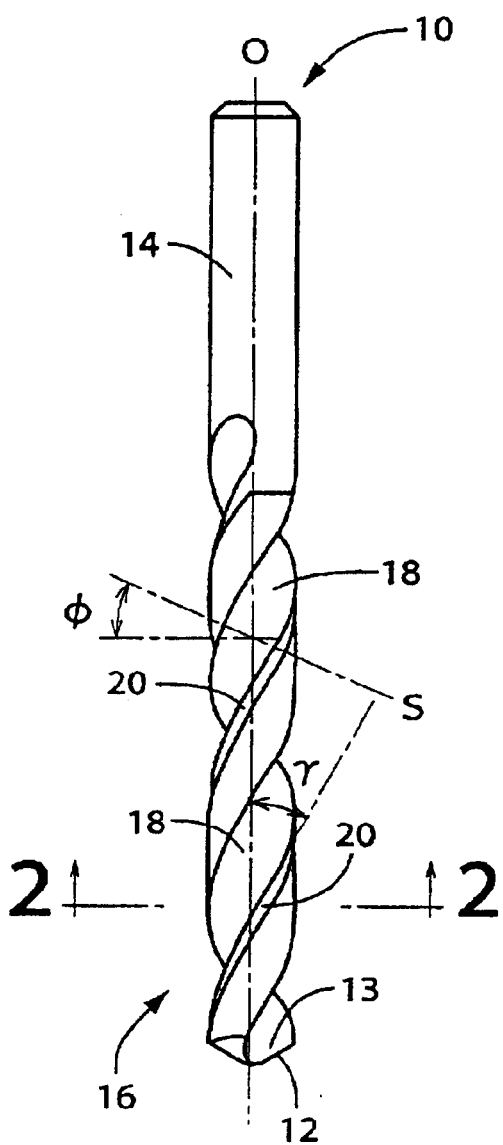
FIG. 1A is a front elevational view of a drill constructed according to an embodiment of the invention.
Figure 1B:
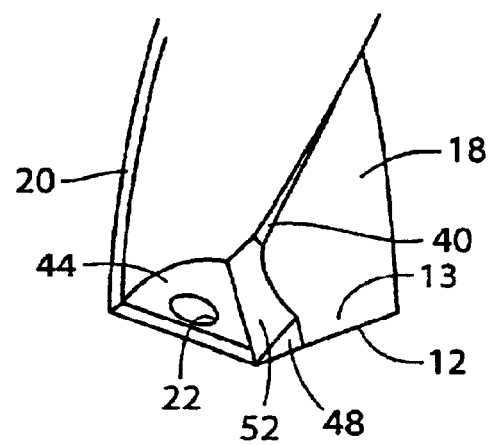
FIG. 1B is a front view showing in enlargement an axially distal end portion of the drill of FIG. 1A.
Figure 1C:
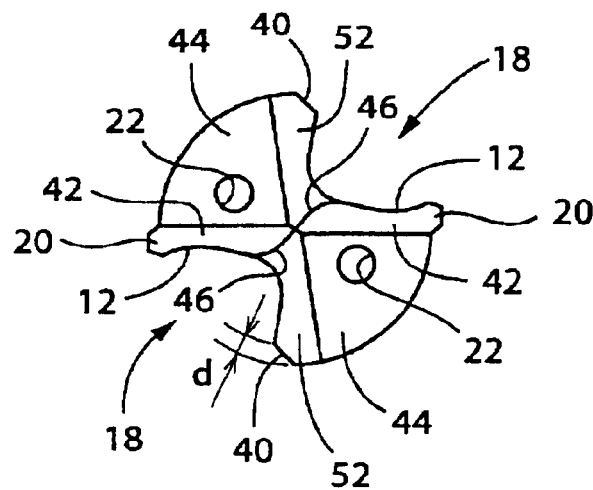
FIG. 1C is a lower plan view of the drill of FIG. 1A.

FIGS. 1A–1C show a drill 10 which is constructed according to an embodiment of this invention. FIG. 1A is a front elevational view of the drill 10 as seen in a direction perpendicular to an axis O of the drill 10. FIG. 1B is a front view showing in enlargement an axially distal end portion of the drill 10 in which a pair of cutting lips or edges 12 and their respective rake surfaces 13 are formed. FIG. 1C is a lower plan view of the drill 10, showing in enlargement the axially distal end portion of the drill 10. This drill 10 is of a two-fluted twist drill, and is formed of a cemented carbide. The drill 10 includes a cylindrical shank portion 14 and a cylindrical body portion 16 which are coaxial with each other and which are formed integrally with each other. The integrally formed cylindrical shank and body portions 14, 16 cooperate with each other to constitute a body of the drill 10, which is referred to as a drill body. The cylindrical body portion 16 has a pair of chip evacuation flutes 18 formed to extend from the axially distal end portion of the drill 10 toward the shank portion 14. Each of the flutes 18 is twisted in a clockwise direction, by a predetermined helix angle γ with respect to the axis O. Each of the cutting edges 12 is provided by an axially distal open end of the corresponding flute 18. The cylindrical body portion 16 further has a pair of lands 24 which correspond to peripheral portions of the body portion 16 not cut away by the flutes 18. The lands 24 have respective outer circumferential surfaces in the form of flank surfaces 28 which have a clearance diameter. The drill 10 is rotated in a predetermined rotating direction, i.e., in a clockwise direction as seen in a direction away from the shank portion 14 toward the axially distal end portion of the body portion 16, while being axially moved toward a workpiece, so that the workpiece is cut by the cutting edges 12 whereby a hole is formed in the workpiece, while chips produced as a result of the cutting of the workpiece is evacuated from the hole toward the shank portion 14 via the chip evacuation flutes 18.

Figure 2A:
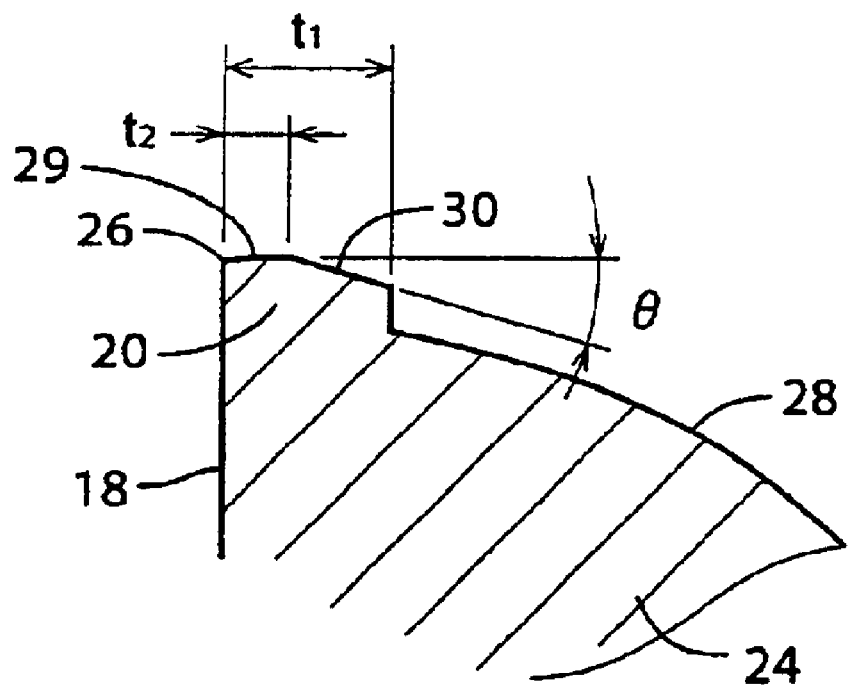
FIG. 2A is a cross sectional view taken along line 2—2 of FIG. 1A, and showing a portion including a margin of the drill where a relief surface is formed in the margin.

FIG. 2A is a cross sectional view which is taken along line 2—2 of FIG. 1A, namely, taken in a plane perpendicular to the axis O. This cross sectional view of FIG. 2A shows in enlargement a radially outer part of the cylindrical body portion 16 in which a margin 20 is formed on a rear side of each flute 18 as viewed in the rotating direction of the drill 10 and extends along the flute 18. A leading edge 26 is provided by one of widthwise opposite edges of each flute 18 which is located on a rear side of the other edge as viewed in the rotating direction, and extends along the flute 18 like the margin 20. An outside diameter of the margins 20 in the axially distal end portion of the body portion 16 is substantially equal to a diameter D of the drill 10, i.e., a diameter of the cutting edges 12. However, a cylinder defined by a rotary trajectory of the margins 20 is slightly back-tapered so that the diameter of the margins 20 is gradually reduced as viewed in a direction away from the axially distal end portion toward the axially proximal end portion of the body portion 16.

Figure 3:
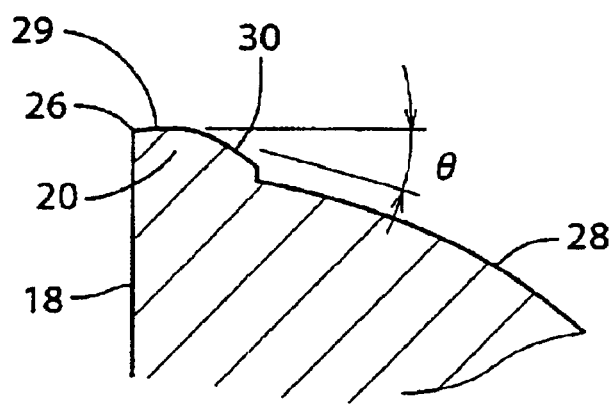
FIG. 3 is the cross sectional view taken along line 2—2 of FIG. 1A, and showing a relief surface having a cross sectional shape that is different from the relief surface of FIG. 2A.
Figure 4:
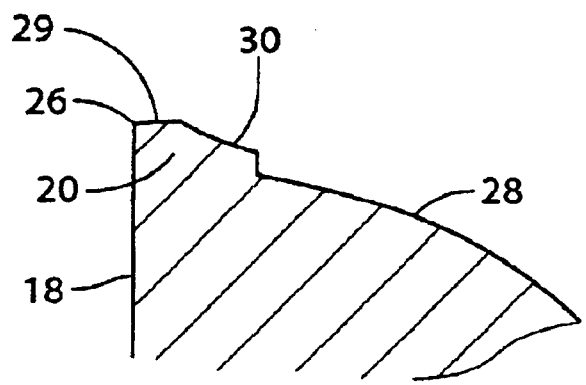
FIG. 4 is the cross sectional view taken along line 2—2 of FIG. 1A, and showing a relief surface having a cross sectional shape that is also different from the relief surface of FIG. 2A.

As shown in FIG. 2A, each margin 20 has a non-relief surface 29 which interests the corresponding one of the flutes 18 to provide the leading edge 26 at the intersection, and a relief surface 30 which is located on a rear side of the non-relief surface 29 as viewed in the rotating direction of the drill 10. The non-relief surface 29 has a width $t_2$ of 0.1–0.5 mm as measured in a circumferential direction of the cylindrical body portion 16. A radial distance of the relief surface 30 from the axis O is gradually reduced as viewed in the rotating direction, i.e., in the clockwise direction as seen in FIG. 2A. The relief surface 30 may have a straight shape (as shown in FIG. 2A), a convexed shape that is convexed outwardly in the radial direction (as shown in FIG. 3), or a concaved shape concaved toward the axis O (as shown in FIG. 4) as seen in a cross sectional plane perpendicular to the axis O. The relief surface 30 can be formed substantially in the same manner as in a grinding operation for forming a flank surface of an outer peripheral cutting edge of a milling cutter. That is, the relief surface 30 can be formed by rotating and axially moving a grinding wheel and the drill 10 relative to each other, such that the grinding wheel moves along the margin 20 while the grinding wheel is being forced onto the margin 20. In the present embodiment, the relief surface 30 is formed not only in the axially distal end portion of the body portion 16 (in which the cutting edges 100 are formed) but also in the other portions of the body portion 16. Namely, the relief surface 30 is formed over the entire axial length of the margin 20. The thus formed relief surface 30 and the flank surface 28 of the land 24 are connected to each other, with a step having a predetermined height between the two surfaces 30, 28.

Figure 2B:
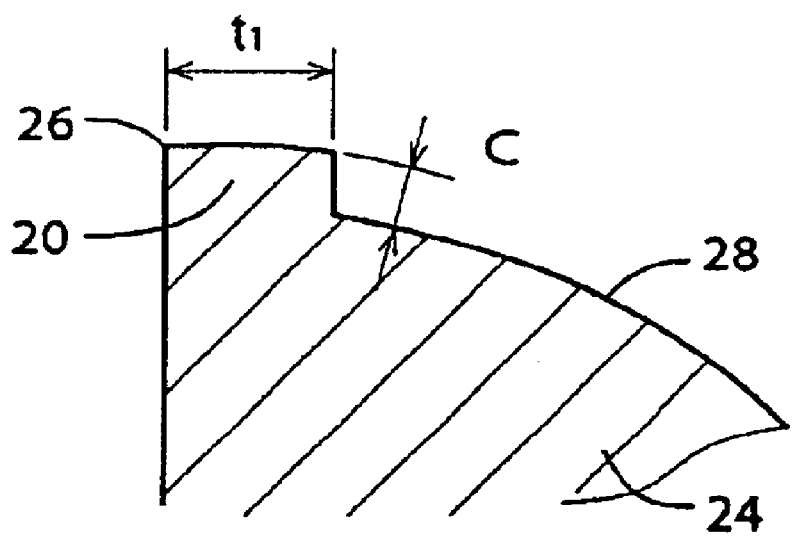
FIG. 2B is the cross sectional view taken along line 2—2 of FIG. 1A, and showing the portion including the margin of the drill where the relief surface is not yet formed in the margin.

Dimensions of the margin 20 varies depending upon the drill diameter D (i.e., the diameter of the cutting edges 12). Where the drill diameter D is 6 mm, for example, the width $t_2$ of the non-relief surface 29 is about 0.2 mm (0.18–0.22 mm), while the relief surface 30 has a clearance angle θ of 14–16°. This clearance angle θ is defined as an angle with respect to a line that is tangent, at a rear end of the non-relief surface 29, to a circle on the plane perpendicular to the axis O. The width $t_1$ of the margin 20 is about 1.2 mm (1.15–1.25 mm). A body diameter clearance C (i.e., the radial distance of the flank surface 28 of the land 24 from the non-relief surface 29) is about 0.4 mm (0.37–0.43 mm), although this body diameter clearance C is slightly changed as viewed in the axial direction due to the above-described back-tapered shape of the margin 20. The relief surface 30 is formed such that each of the dimensions of the margin 20 is held within the corresponding one of the above-described ranges throughout the entire axial length of the margin 20. It is noted that FIG. 2B shows a cross sectional shape of the margin 20 before the relief surface 30 is formed. It is also noted that FIGS. 2A, 2B, 3 and 4 are merely schematic views in which elements are not necessarily accurately illustrated, particularly, in their relative dimensions.

Each of the chip evacuation flutes 18 is formed by using a flute-forming grinding wheel 32, as shown in FIGS. 5A and 5B, so as to have an unsymmetrical cross sectional shape. The flute-forming grinding wheel 32 has an unsymmetrical convexed outer circumferential surface 38 consisting of two arcuate portions 34, 36 which have respective different radii R, R2 of curvatures and which are connected to each other at the radially outer end of the outer circumferential surface 38. In the grinding operation for forming the flute 18, the grinding wheel 32 is first positioned in a predetermined position relative to a drill blank (for the drill 10) such that an axis S of the grinding wheel 32 is inclined with respect to a direction perpendicular to an axis of the drill blank (corresponding to the axis O of the drill 10) by an angle Φ that is equal to the above-described predetermined helix angle γ. After positioning the grinding wheel 32 in the predetermined position relative to the drill blank, the grinding wheel 32 held in contact with the drill blank is rotated about the axis S, while the grinding wheel 32 and the drill blank are moved relative to each other in the circumferential direction as well as in the axial direction. In this instance, a ratio of an amount of the relative movement in the axial direction to an amount of the relative movement in the circumferential direction is determined on the basis of the predetermined helix angle γ.

It is common that at least one of the axial end surfaces of the grinding wheel 32 interferes with a portion of the flute 18 which portion is located in a rear side of a portion of the flute 18 being currently ground by the grinding wheel 32, namely, which portion has been already ground by grinding wheel 32. As a result, the cross sectional shape of the formed flute 18 is not completely identical with the profile of the outer circumferential surface 38 of the grinding wheel 32, due to the above-described interference. However, the formed flute 18 has the unsymmetrical cross sectional shape substantially corresponding to the unsymmetrical outer circumferential surface 38. Since the grinding wheel 32 is positioned relative to the drill blank such that the leading edge 26 is closer to the first arcuate portion 34 having the relatively small radius R1 of curvature, than to the second arcuate portion 36 having the relatively large radius R2 of curvature, a rear-side one of the widthwise opposed side surfaces of the flute 18 has a smaller radius of curvature in its cross section while a front-side one of the widthwise opposed side surfaces of the flute 18 has a larger radius of curvature in its cross section.

The radii R1, R2 of curvatures are determined on the basis of an axial width W of the grinding wheel 32, such that the radius R2 of curvature is held within a range of 1.5 times to 3.0 times the radius R1 of curvature and such that the sum of the radii R1, R2 of curvatures are held equal to the axial width W of the grinding wheel 32, as shown in FIG. 5C. That is, the radii R1, R2 of curvatures are determined such that the following two expressions are satisfied.

1.5R1≦R2≦3.0R1

R1+R2=W

The axial width W of the grinding wheel 32 is commonly about a half of the drill diameter D. The diameter DD of the grinding wheel 32 is substantially constant, and is about 80 mm, for example.

While the leading edge 26 is provided by the rear-side one of the widthwise opposite edges of each flute 18, a beveled face 40 is formed by chamfering the front-side one of the widthwise opposite edges of each flute 18, as shown in FIG. 1C. In other words, the beveled face 40 is formed in a rear end (heel end) of each land 24. The beveled face 40 has a width d of 0.15D to 0.25D as measured in the radial direction, where D represents the drill diameter. Where the drill diameter D is 6 mm, for example, the width d of the beveled face 40 is held within a range of 1.12–1.28 mm. In the present embodiment, the beveled face 40 is adapted to be straight as seen in a cross sectional plane perpendicular to the axis O, and is inclined with respect to the flank surface 28 of the land 24 by about 45°.

Figure 6A:
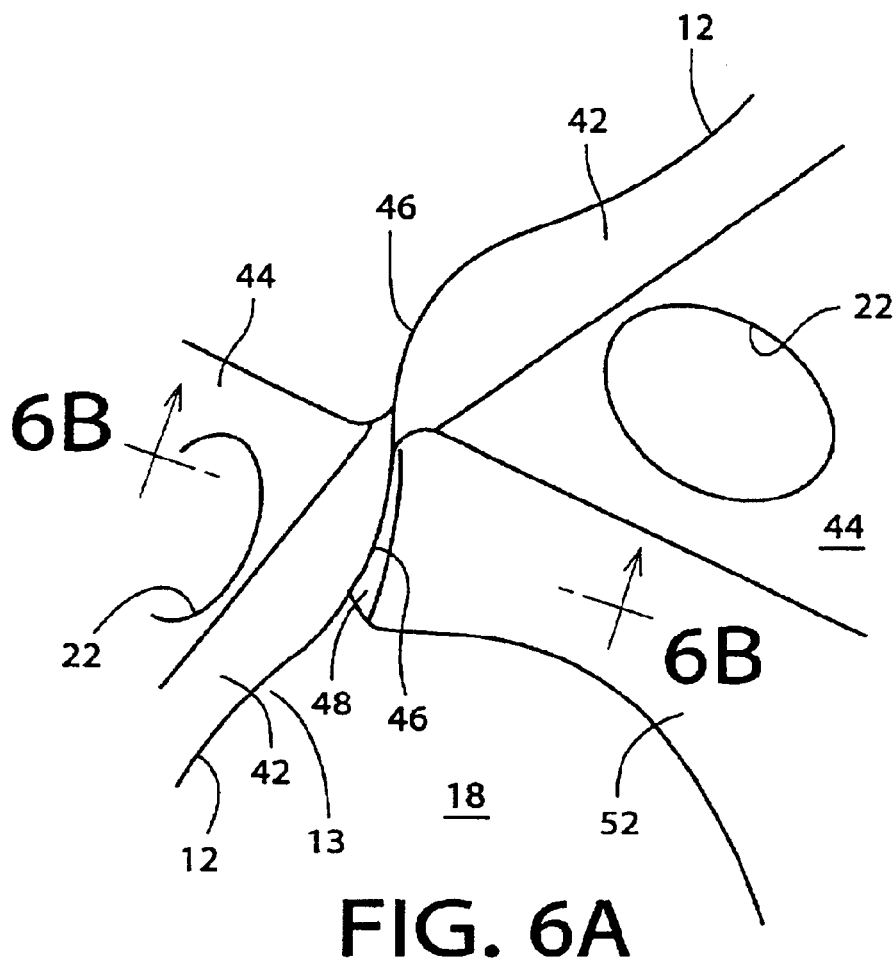
FIG. 6A is a perspective view in enlargement the axially distal end portion of the drill of FIG. 1A.
Figure 6B:
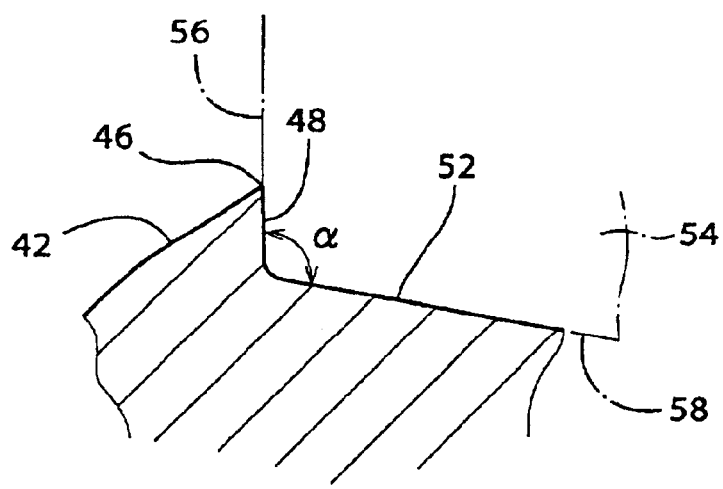
FIG. 6B is a cross sectional view taken along line 6B—6B of FIG. 6A.

The cylindrical body portion 16 further has a pair of distal end flank surfaces each of which is located on a rear side of a corresponding one of the cutting edges 12, as viewed in the rotating direction of the drill 10. Each of the distal end flank surfaces includes a first flank surface 42 and a second flank surface 44 which is located on a rear side of the first flank surface 42. A pair of oil holes 22 are formed throughout the axial length of the drill body, so as to helically extend substantially in parallel with the respective flutes 18. Each of the oil holes 22 opens in the second flank surface 44 of the corresponding one of the distal end flank surfaces, whereby a cutting fluid or air blast can be supplied through the oil holes 22 to a cutting point at which the workpiece is cut by the cutting edges 12. A chisel edge of the drill 10 is subjected to an operation of so-called "R-type thinning", such that a radially inner portion of each of the cutting edges 12 and a portion of the corresponding rake surface 13 (which portion is adjacent to the radially inner portion of the cutting edge 12) are ground to respectively provide a secondary cutting edge 46 and a secondary rake surface 48 such that the secondary cutting edge 46 is curved to have a predetermined radius of curvature as seen in the bottom plan view of FIG. 1C while the secondary rake surface 48 is recessed in such a direction that permits a web thickness in the axially distal end portion of the body portion 16 to be reduced. The secondary cutting edge 46 is connected smoothly to the other portion of the cutting edge 12, which portion is referred to as a primary cutting edge 12. The secondary rake surface 48 is contiguous to the other portion of the rake surface 13, which portion is referred to as a primary rake surface 13. In the thinning operation, an inclined surface 52 is formed together with the secondary cutting edge 12 and the secondary rake surface 48 such that the inclined surface 52 is contiguous to the secondary rake surface 48, as shown in FIGS. 6A and 6B which are a perspective view in enlargement the axially distal end portion of the body portion 16 and a cross sectional view taken along line 6B—6B of FIG. 6A, respectively. It is noted that the secondary cutting edge 46 is curved so as to be convexed forwardly as viewed in the rotating direction of the drill 10.

The thinning operation is executed by using a thinning grinding wheel 54 which is indicated by one-dot chain line in FIG. 6B, such that the grinding wheel 54 and the drill 10 are three-dimensionally moved relative to each other while the drill 10 is rotated about its axis O. In the thinning operation, the secondary rake surface 48 is formed by one 56 of axially opposite end surfaces of the grinding wheel 54, while at the same time the inclined surface 52 is formed by an outer circumferential surface 58 of the grinding wheel 54 which interests the axial end surface 56 at an angle α of 90–110°, e.g., about 100°. The inclined surface 52, having a complicated three-dimensional geometry owing to the three-dimensional movement of the grinding wheel 54 and the drill 10 relative to each other, is located on a rear side of the second flank surface 44 and is contiguous to the second flank surface 44. The inclined surface 52 is inclined as viewed in the rotating direction of the drill 10, so as to have a predetermined clearance angle that is larger than that of the second flank surface 44. The inclined surface 52 is inclined, also as viewed in the radial direction of the cylindrical body portion 16, toward the shank portion 14 as the inclined surface 52 extends from the secondary rake surface 48 toward the periphery of the body portion 16 in the rightward direction as seen in FIG. 6B, i.e., in a direction substantially perpendicular to the secondary cutting edge 46. In other words, an axial distance between the inclined surface 52 and the proximal end of the body portion 16 is gradually reduced as viewed in the direction away from the secondary rake surface 48 toward the periphery of the body portion 16. The inclined surface 52 extends from the secondary rake surface 48 up to the periphery of the body portion 16, as is apparent from FIG. 1C.

The axial end surface 56 and the outer circumferential surface 58 of the grinding wheel 54 intersect each other via a curved beveled face having a predetermined radius of curvature, so that the intersection between the secondary rake surface 48 and the inclined surface 52 is formed by the curved beveled face of the grinding wheel 54, assuring no step between the two adjacent surfaces 48, 52.

The thinning operation may be carried out either before or after the formation of the first and second flank surfaces 42, 44. In the present embodiment, the thinning operation requiring a high degree of accuracy is carried out before the formation of the first and second flank surfaces 42, 44.

The cylindrical body portion 16 having the cutting edges 12, 46 and the flutes 18 formed therein is coated at its outer surface with a hard coating, which is formed of TiAlN alloy as an intermetallic compound in accordance with an arc ion plating method or other suitable method.

In the drill 10 constructed according to the present embodiment of the invention in which the secondary rake surfaces 48 of the secondary cutting edge 46 and the inclined surface 52 are connected to each other without a step therebetween, the chips produced by the cutting of the workpiece with the secondary cutting edge 46 are easily evacuated from the hole. The easy evacuation of the chips leads to a reduction in a thrust load applied to the drill and minimizes a heat generation during a drilling operation with the drill, thereby increasing the number of the holes which can be drilled without regrinding or resharpening the cutting edges of the drill, and accordingly prolonging the tool life.

In the present embodiment, the inclined surface 52 is formed by the outer circumferential surface 58 of the thinning grinding wheel 54, while the secondary rake surface 48 of the secondary cutting edge 46 is formed, concurrently with the formation of the inclined surface 52, by the axial end surface 56 of the grinding wheel 54 which intersects the outer circumferential surface 58 of the grinding wheel 54 at a predetermined angle α of about 100°. Owing to this arrangement, the intersection between the secondary rake surface 48 and the inclined surface 52 is formed by the intersection between the axial end surface 56 and the outer circumferential surface 58 of the grinding wheel 54, whereby the profile of the grinding wheel 54 is transferred to the formed two adjacent surfaces 48, 52, assuring absence of step between the two adjacent surfaces 48, 52. Further, in this arrangement in which the two adjacent surfaces 48, 52 are formed together with each other at a single step, the number of required steps and cost for manufacturing the drill are reduced to be smaller than in the conventional arrangement in which the two adjacent surfaces are formed at two individual steps at each of which a complicated positioning of the grinding wheel relative to the drill is required prior to the grinding operation.

In the drill 10 of this embodiment of the invention, the margin 20 has, in addition to the non-relief surface 29 having the width $t_2$ of 0.1–0.5 mm (e.g., about 0.2 mm), the relief surface 30 which is located on the rear side of the non-relief portion 29 and which has the radial distance from the axis O that is gradually reduced as viewed in the rotating direction of the drill 10. This arrangement is effective to reduce the area of contact of the margin 20 and the inner circumferential surface of the hole, without reduction in the strength of the margin which reduction would increase a risk of fracture or chipping of the tool, thereby preventing increases of the cutting torque due to the friction generated by the contact, and improving the cutting performance of the tool. Therefore, the arrangement advantageously increases the number of the holes which can be drilled without regrinding or resharpening the cutting edges of the drill, and accordingly prolongs the tool life.

In the drill 10 of this embodiment of the invention, since the width $t_2$ (about 0.2 mm) of the non-relief surface 29 is not larger than two thirds of the width $t_1$ (about 1.2 mm) of the margin 20, the generation of the friction due to the contact of the margin 20 and the inner circumferential surface is sufficiently reduced, whereby the above-described technical advantage owing to the reduction of the friction is reliably obtained. Further, since the clearance angle θ of the relief surface 30 is not larger than 20°, for example, held within a range of 14–16°, so that a step having a predetermined height exists between a rear end of the margin 20 and the flank surface 28 of the land 24, it is possible to obtain the technical advantage owing to the reduction of the friction while assuring the sufficiently high degree of strength of the margin 20.

In the present embodiment, the chip evacuation flute 18 is formed by the flute-forming grinding wheel 32 having the unsymmetrical convexed outer circumferential surface 38 including the two arcuate portions 34, 36 which have the respective different radii R1, R2 of curvatures and which are connected to each other at the radially outer end of the outer circumferential surface 38. Therefore, the flute 18 also has an unsymmetrical cross sectional shape, which makes it possible to divide each of the chips into smaller pieces, by one of the widthwise opposed side surfaces of the flute 18 which has a smaller radius R1 of curvature than that of the other, thereby facilitating evacuation of the chips from the hole, and further reliably preventing the flute 18 from being clogged up with the chips. Further, the grinding wheel 32 is positioned relative to the drill 10 such that the leading edge 26 is closer to the first arcuate portion 34 having the relatively small radius R1 of curvature, than to the second arcuate portion 36 having the relatively large radius R2 of curvature, so that the above-described one of the widthwise opposed side surfaces having the smaller radius of curvature provides a rear-side one of the widthwise opposed side surfaces of the flute 18, onto which the chips are likely to be concentrated, rather than onto a front-side one of the widthwise opposed side surfaces. This arrangement is effective to further reliably divide each chip into smaller pieces and further effectively prevent the flute 18 from being clogged.

The drill 10 of this embodiment of the invention, having the pair of oil holes 22 formed to extend through the drill body and open in the respective second flank surfaces 44, is capable of drilling the hole in a workpiece with supply of a lubricant oil or other cutting fluid through the oil holes 22, by minimizing the friction between the drill 10 and the inner surface of the hole and accordingly reducing the heat generation and the wear of the drill body, even where the workpiece is made of a hard material such as an alloy steel. Thus, the drill 10 has a further prolonged tool life.

In the drill 10 of this embodiment of the invention in which the drill body is formed of a cemented carbide while the cylindrical body portion 16 is coated with a hard coating formed of TiAlN alloy, the heat generation and the wear of the drill body due to the friction are further effectively minimized, whereby the tool life is further prolonged.

In the drill 10 of this embodiment of the invention in which the beveled face 40 having a width of 0.15–0.25 times the drill diameter D is formed at the rear end of the land 24, the chips are effectively evacuated from the hole, preventing the chip evacuation flute 18 from being clogged up with the chips.

Figure 9A:
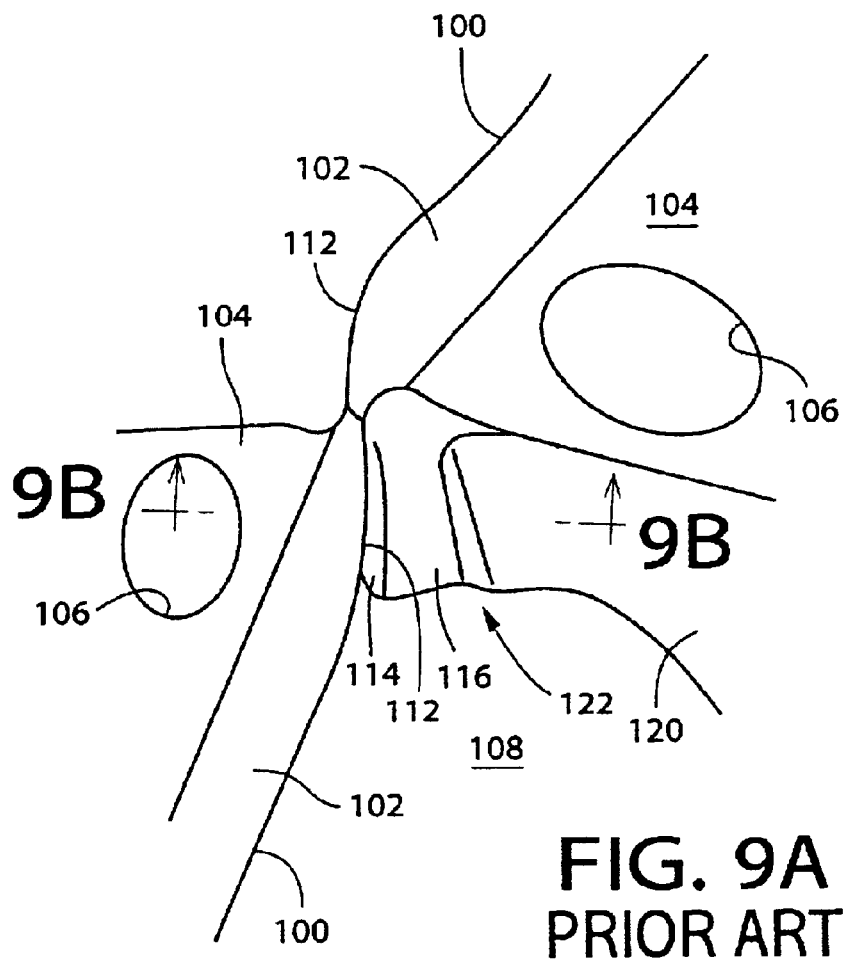
FIG. 9A is a perspective view in enlargement an axially distal end portion of a conventional drill.
Figure 9B:
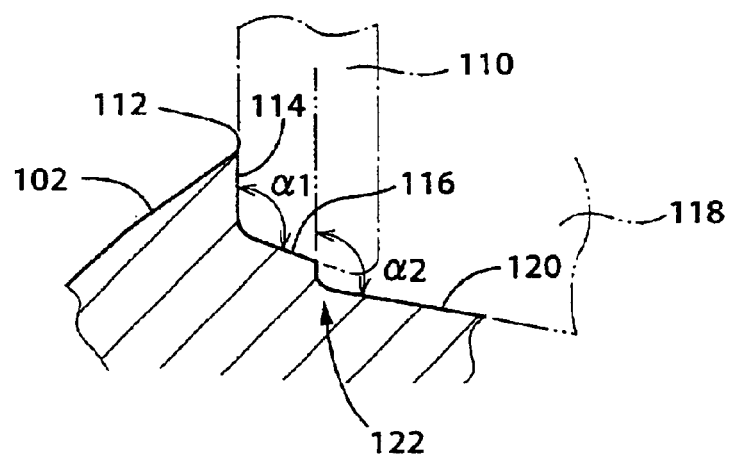
FIG. 9B is a cross sectional view taken along line 9B—9B of FIG. 9A.

A cutting test was conducted by using two sets of two-fluted twist drills each having a diameter D of 10 mm. Each set included an "EXAMPLE" which was constructed according to the present invention, and "COMPARATIVE EXAMPLES I and II" which are identical with each other in that the step 122 exists as shown in FIG. 9B while a relief surface is not formed in the margin 20 as shown in FIG. 2B. In the test in a workpiece was drilled by these drills under a cutting condition as specified below, a number of holes had been formed before the brakeage of each drill, an amount of the thrust load applied to each drill and a degree of surface hardness of an inner surface of the formed holes were checked as indicated by the respective graphs of FIGS. 7A–7C. Each of the amounts of the thrust load and the surface hardness indicated in respective FIGS. 7B and 7C is an average amount. The amount of surface hardness was measured in accordance with "Vickers Hardness test method" as defined in JIS Z 2244, and represents a work hardening of the inner surface of the hole which was caused by its frictional contact with the margins 20 of the drill in the drilling operation.

[Cutting Condition]
Workpiece: S50C (Carbon steel for machine structural use)
Cutting velocity: 80 m/min
Feed rate: 0.25 mm/rev
Depth of hole: 30 mm (blind hole)
Cutting fluid: Water soluble fluid (with dilution ratio of 5%)

Figure 7A:
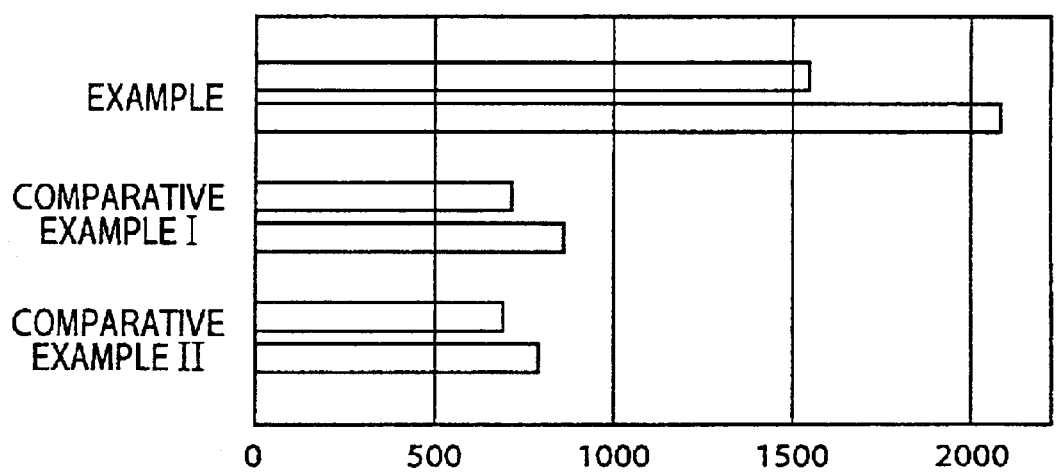
FIG. 7A is a graph indicating the number of holes formed in a test in which a workpiece formed of a carbon steel (for machine structural use) is drilled by using the drill of the present invention as EXAMPLE and other drills as COMPARATIVE EXAMPLES I and II.
Figure 7B:
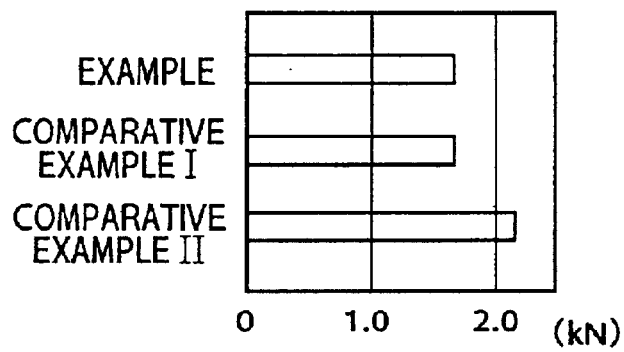
FIG. 7B is a graph indicating a thrust load applied to each of the drills in the above-described test.
Figure 7C:
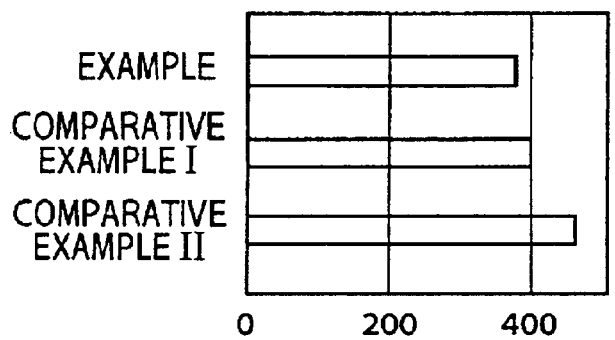
FIG. 7C is a graph indicating a degree of surface hardness of the holes formed in the test.

As is apparent from FIGS. 7A–7C, the number of the holes formed by the drill of EXAMPLE is more than twice the number of the holes formed by the drill of each of COMPARATIVE EXAMPLES I and II. This means that the tool life of EXAMPLE is more than twice that of each of COMPARATIVE EXAMPLES I and II. The amount of the thrust load applied to the drill of EXAMPLE is substantially equal to the amount of the thrust load applied to the drill of COMPARATIVE EXAMPLE I, and is smaller than the amount of the thrust load applied to the drill of COMPARATIVE EXAMPLE II. The amount of the surface hardness of the inner surface of the hole formed by EXAMPLE is smaller than the amount of the surface harness of the inner surface of the formed hole formed by each of COMPARATIVE EXAMPLES I and II.

Figure 8:
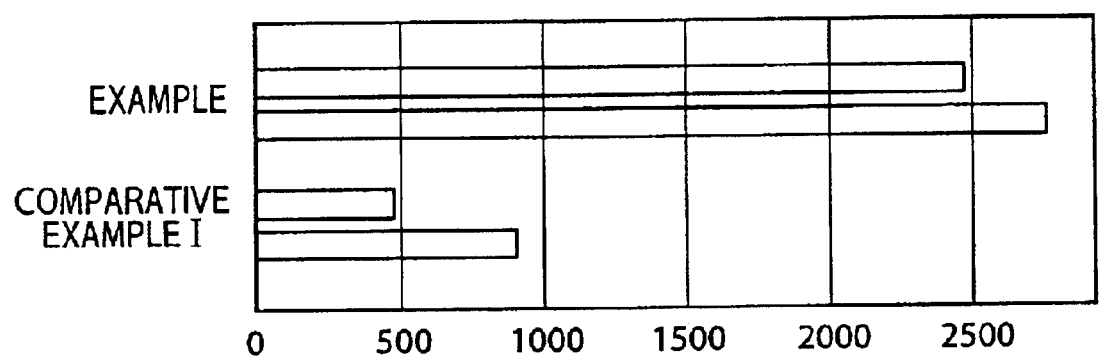
FIG. 8 is a graph indicating the number of holes in another test in which a workpiece formed of a chrome molybdenum steel is drilled by using the above-described EXAMPLE and COMPARATIVE EXAMPLE I.

Another cutting test was conducted by using two sets of two-fluted twist drills each having a diameter D of 6 mm. Each set included an "EXAMPLE" which was constructed according to the present invention, and "COMPARATIVE EXAMPLE I" which was constructed such that the step 122 exists as shown in FIG. 9B while a relief surface is not formed in the margin 20 as shown in FIG. 2B. In the test in a workpiece was drilled by these drills under a cutting condition as specified below, a number of holes had been formed before the brakeage of each drill was checked as indicated by the graph of FIG. 8. As is apparent from FIG. 8, the number of the holes formed by the drill of EXAMPLE is about three times or five times the number of the holes formed by the drill of COMPARATIVE EXAMPLE I.

[Cutting Condition]
Workpiece: SCM440 (Chrome molybdenum steel)
Cutting velocity: 80 m/min
Feed rate: 0.18 mm/rev
Depth of hole: 18 mm (blind hole)
Cutting fluid: Water soluble fluid (with dilution ratio of 5%)

While the presently preferred embodiment of the present invention have been illustrated above, it is to be understood that the invention is not limited to the details of the illustrated embodiment, but may be embodied with various other changes, modifications and improvements, which may occur to those skilled in the art, without departing from the spirit and scope of the invention defined in the following claims.

What is claimed is:

1. A drill which is to be rotated about an axis thereof in a predetermined rotating direction, for drilling a hole in a workpiece, comprising:

a cylindrical body portion having:

primary cutting edges and secondary cutting edges formed in an axially distal end portion thereof such that each of said secondary cutting edges is located on a radially inner side of a corresponding one of said primary cutting edges;

flutes, each of which extends from said axially distal end portion toward an axially proximal end portion thereof;

distal end flank surfaces, each of which is located on a rear side of a corresponding one of said primary cutting edges and a corresponding one of said secondary cutting edges as viewed in said predetermined rotating direction, and each of which has a clearance angle that permits an axial distance between each of said flank surfaces and said axially proximal end portion to be reduced as viewed in said predetermined rotating direction;

inclined surfaces, each of which is located on a rear side of a corresponding one of said flank surfaces as viewed in said predetermined rotating direction, and has a clearance angle larger than that of the corresponding one of said flank surfaces;

primary rake surfaces, each of which defines a corresponding one of said primary cutting edges; and secondary rake surfaces, each of which defines a corresponding one of said secondary cutting edges, such that each of said secondary rake surfaces is located on a radially inner side of a corresponding one of said primary rake surfaces;

wherein each of said secondary rake surfaces and the corresponding one of said primary rake surfaces are provided by an axially distal end portion of a rear side wall, as viewed in said predetermined rotating direction, of a corresponding one of said flutes, wherein each of said secondary rake surfaces is recessed in such a direction that permits a web thickness in said axially distal end portion to be reduced, wherein each of said inclined surfaces extends from a corresponding one of said secondary rake surfaces up to a periphery of said cylindrical body portion, and is inclined such that an axial distance between each of said inclined surfaces and said axially proximal end portion is reduced as viewed in a direction substantially perpendicular to a corresponding one of said secondary cutting edges, from the corresponding one of said secondary rake surfaces toward said periphery of said cylindrical body portion, and wherein each of said inclined surfaces and the corresponding one of said secondary rake surfaces are connected to each other without a step therebetween.

2. A method of manufacturing a drill which is to be rotated about an axis thereof in a predetermined rotating direction for drilling a hole in a workpiece, and which comprises a shank portion and a cylindrical body portion contiguous to each other, wherein said cylindrical body portion includes:

(a) primary cutting edges and secondary cutting edges formed in an axially distal end portion thereof such that each of said secondary cutting edges is located on a radially inner side of a corresponding one of said primary cutting edges;

(b) primary rake surfaces of said primary cutting edges and secondary rake surfaces of said secondary cutting edges; and (c) inclined surfaces, each of which extends from a corresponding one of said secondary rake surfaces up to a periphery of said cylindrical body portion, and is inclined such that an axial distance between each of said inclined surfaces and said shank portion is reduced as viewed in a direction substantially perpendicular to a corresponding one of said secondary cutting edges, from the corresponding one of said secondary rake surfaces toward said periphery of said cylindrical body portion, said method comprising:

a step of forming each of said inclined surfaces from one of said secondary rake surfaces up to a periphery of said cylindrical body portion by an outer circumferential surface of a grinding wheel, while at the same time forming the corresponding one of said secondary rake surfaces by an axial end surface of said grinding wheel which intersects said outer circumferential surface of said grinding wheel at a predetermined angle.

3. A method according to claim 2, wherein said predetermined angle is 90–110°.

4. A drill according to claim 1, wherein said cylindrical body portion further includes distal end flank surfaces each of which is located on a rear side of a corresponding one of said primary cutting edges and a corresponding one of said secondary cutting edges as viewed in said predetermined rotating direction, and each of which has a clearance angle that permits an axial distance between each of said flank surfaces and said shank portion to be reduced as viewed in said predetermined rotating direction, wherein each of said inclined surfaces is located on a rear side of a corresponding one of said flank surfaces as viewed in said predetermined rotating direction, and has a clearance angle which is larger than that of the corresponding one of said flank surfaces, and wherein each of said secondary cutting edges is curved as seen in a plan view that is perpendicular to said axis.

5. A drill which is to be rotated about an axis thereof in a predetermined rotating direction, for drilling a hole in a workpiece, and which comprises a shank portion and a cylindrical body portion contiguous to each other, wherein said cylindrical body portion comprises:

primary cutting edges and secondary cutting edges formed in an axially distal end portion thereof such that each of said secondary cutting edges is located on a radially inner side of a corresponding one of said primary cutting edges;

primary rake surfaces, each of which defines a corresponding one of said primary cutting edges;

secondary rake surfaces, each of which defines a corresponding one of said secondary cutting edges; and inclined surfaces, each of which extends from a corresponding one of said secondary rake surfaces to a periphery of said cylindrical body portion, and is inclined such that an axial distance between each of said inclined surfaces and said shank portion is reduced as viewed in a direction substantially perpendicular to a corresponding one of said secondary cutting edges, from the corresponding one of said secondary rake surfaces toward said periphery of said cylindrical body portion, wherein each of said secondary rake surfaces and the corresponding one of said secondary cutting edges are formed together with each other in a web thinning, wherein each of said secondary rake surfaces and the corresponding one of said inclined surfaces are connected to each other without a step therebetween, wherein said cylindrical body portion has flutes, each of which extends from said axially distal end portion toward an axially proximal end portion thereof, and margins, each of which is located on a rear side of a corresponding one of said flutes and extends along a corresponding one of said flutes, wherein each of said margins has a non-relief surface which intersects the corresponding one of said flutes to provide a leading edge, and a relief surface which is located on a rear side of said non-relief surface as viewed in said predetermined rotating direction, wherein said non-relief surface has a width of 0.1–0.5 mm as measured in a circumferential direction of said cylindrical body portion, and wherein a radial distance of said non-relief surface from said axis is substantially constant as viewed in said predetermined rotating direction, while a radial distance of said relief portion from said axis is gradually reduced as viewed in said predetermined rotating direction.

6. A drill according to claim 5, wherein said width of said non-relief surface is not larger than two thirds of a width of each of said margins as measured in said circumferential direction.

7. A drill according to claim 5, wherein said cylindrical body portion further has lands each of which is located on a rear side of a corresponding one of said margins as viewed in said predetermined rotating direction, wherein said relief surface of each of said margins has a predetermined clearance angle not larger than 20° as seen in a cross sectional plane perpendicular to said axis, and wherein said relief surface of each of said margins and a surface of a corresponding one of said lands are connected to each other with a step therebetween.

8. A drill according to claim 1, wherein said cylindrical body portion further includes distal end flank surfaces, each of which is located on a rear side of a corresponding one of said primary cutting edges and a corresponding one of said secondary cutting edges as viewed in said predetermined rotating direction, and wherein said drill further comprises oil holes which are formed to extend in an axial direction thereof and which open in said end flank surfaces.

9. A drill according to claim 1, wherein said cylindrical body portion is provided by a substrate which is formed of a hard tool material and which is coated with a hard coating.

10. A drill according to claim 9, wherein said hard coating is formed of an intermetallic compound that consists of a solid solution including at least one of carbide, nitride and carbon nitride each of which includes at least one of metals which belong to respective groups IIIb, IVa, Va and VIa of the periodic table.

11. A drill which is to be rotated about an axis thereof in a predetermined rotating direction, for drilling a hole in a workpiece, and which comprises a shank portion and a cylindrical body portion contiguous to each other, wherein said cylindrical body portion comprises:

primary cutting edges and secondary cutting edges formed in an axially distal end portion thereof such that each of said secondary cutting edges is located on a radially inner side of a corresponding one of said primary cutting edges;

primary rake surfaces, each of which defines a corresponding one of said primary cutting edges;

secondary rake surfaces, each of which defines a corresponding one of said secondary cutting edges; and inclined surfaces, each of which extends from a corresponding one of said secondary rake surfaces to a periphery of said cylindrical body portion, and is inclined such that an axial distance between each of said inclined surfaces and said shank portion is reduced as viewed in a direction substantially perpendicular to a corresponding one of said secondary cutting edges, from the corresponding one of said secondary rake surfaces toward said periphery of said cylindrical body portion, wherein each of said secondary rake surfaces and the corresponding one of said secondary cutting edges are formed together with each other in a web thinning, wherein each of said secondary rake surfaces and the corresponding one of said inclined surfaces are connected to each other without a step therebetween, wherein said cylindrical body portion further has lands each of which is located on a rear side of a corresponding one of said margins as viewed in said predetermined rotating direction, wherein each of said lands has a beveled face in a rear end thereof as viewed in said predetermined rotating direction, and wherein said beveled face has a width of 0.15 D to 0.25 D as measured in a radial direction of said cylindrical body portion, where D represents a diameter of said primary cutting edges.

12. A drill which is to be rotated about an axis thereof in a predetermined rotating direction, for drilling a hole in a workpiece, comprising:

flutes each extending from an axially distal end portion of said drill toward an axially proximal end portion of said drill; and margins each of which is located on a rear side of a corresponding one of said flutes and extends along a corresponding one of said flutes, wherein each of said margins has a non-relief surface which intersects the corresponding one of said flutes to provide a leading edge, and a relief surface which is located on a rear side of said non-relief surface as viewed in said predetermined rotating direction, wherein said non-relief surface has a width of 0.1–0.5 mm as measured in a circumferential direction of said cylindrical body portion, and wherein a radial distance of said non-relief surface from said axis is substantially constant as viewed in said predetermined rotating direction, while a radial distance of said relief portion from said axis is gradually reduced as viewed in said predetermined rotating direction.

13. A drill according to claim 12, wherein said width of said non-relief surface is not larger than two thirds of a width of each of said margins as measured in said circumferential direction.

14. A drill according to claim 12, further comprising lands each of which is located on a rear side of a corresponding one of said margins as viewed in said predetermined rotating direction, wherein said relief surface of each of said margins has a predetermined clearance angle not larger than 20° as seen in a cross sectional plane perpendicular to said axis, and wherein said relief surface of each of said margins and a surface of a corresponding one of said lands are connected to each other with a step therebetween.

15. A method of manufacturing a drill which is to be rotated about an axis thereof in a predetermined rotating direction for drilling a hole in a workpiece, and which comprises a shank portion and a cylindrical body portion contiguous to each other, wherein said cylindrical body portion includes:

(a) primary cutting edges and secondary cutting edges formed in an axially distal end portion thereof such that each of said secondary cutting edges is located on a radially inner side of a corresponding one of said primary cutting edges;

(b) primary rake surfaces of said primary cutting edges and secondary rake surfaces of said secondary cutting edges; and (c) inclined surfaces, each of which extends from a corresponding one of said secondary rake surfaces up to a periphery of said cylindrical body portion, and is inclined such that an axial distance between each of said inclined surfaces and said shank portion is reduced as viewed in a direction substantially perpendicular to a corresponding one of said secondary cutting edges, from the corresponding one of said secondary rake surfaces toward said periphery of said cylindrical body portion, said method comprising:

a step of forming each of said inclined surfaces by an outer circumferential surface of a grinding wheel, while at the same time forming the corresponding one of said secondary rake surfaces by an axial end surface of said grinding wheel which intersects said outer circumferential surface of said grinding wheel at a predetermined angle; wherein said predetermined angle is 90–110°.

16. A method of a manufacturing the drill defined in claim 1, wherein said cylindrical body portion has flutes each of which extends from said axially distal end portion toward an axially proximal end portion thereof, and is twisted by a predetermined helix angle, each of said flutes having widthwise opposite edges one of which is located on a rear side of the other as viewed in said predetermined rotating direction and provides a leading edge, said method comprising:

a step of positioning a grinding wheel in a predetermined position relative to said drill such that an axis of said grinding wheel is inclined with respect to a direction perpendicular to said axis of said drill by an angle that is equal to said predetermined helix angle; and a step of forming each of said flutes by said grinding wheel, after positioning said grinding wheel in said predetermined position, wherein said grinding wheel has a convexed outer circumferential surface including first and second arcuate portions which are connected to each other at a radially outer end of said outer circumferential surface, and wherein said first arcuate portion has a radius of curvature smaller than a radius of curvature of said second arcuate portion.

17. A method according to claim 16, wherein a ratio of said radius of curvature of said second arcuate portion to said radius of curvature of said first arcuate portion is 1.5 to 3.0.

18. A method according to claim 16, wherein said grinding wheel is positioned relative to said drill such that said leading edge is closer to said first arcuate portion than to said second arcuate portion.

* * * * *

UNITED STATES PATENT AND TRADEMARK OFFICE
CERTIFICATE OF CORRECTION

PATENT NO. : 6,923,602 B2
DATED : August 2, 2005
INVENTOR(S) : Jiro Osawa et al.

It is certified that error appears in the above-identified patent and that said Letters Patent is hereby corrected as shown below:

Title page,
Item [73], Assignee, should read -- OSG Corporation, Toyokawa (JP) --.

Signed and Sealed this

Fourth Day of October, 2005

JON W. DUDAS
*Director of the United States Patent and Trademark Office*